A. WINTON & H. B. ANDERSON.
TRANSMISSION CONTROLLING MECHANISM FOR MOTOR VEHICLES.
APPLICATION FILED JAN. 10, 1911.
1,098,143.
Patented May 26, 1914.
4 SHEETS—SHEET 1.
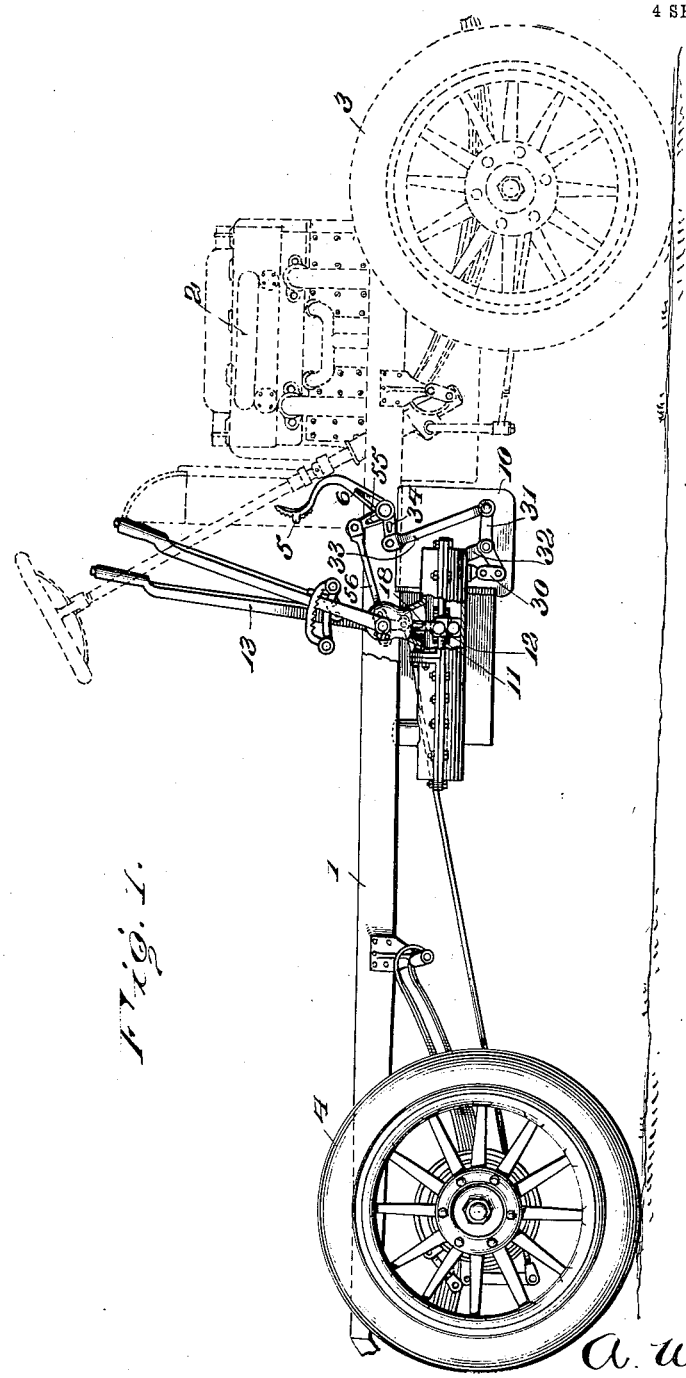

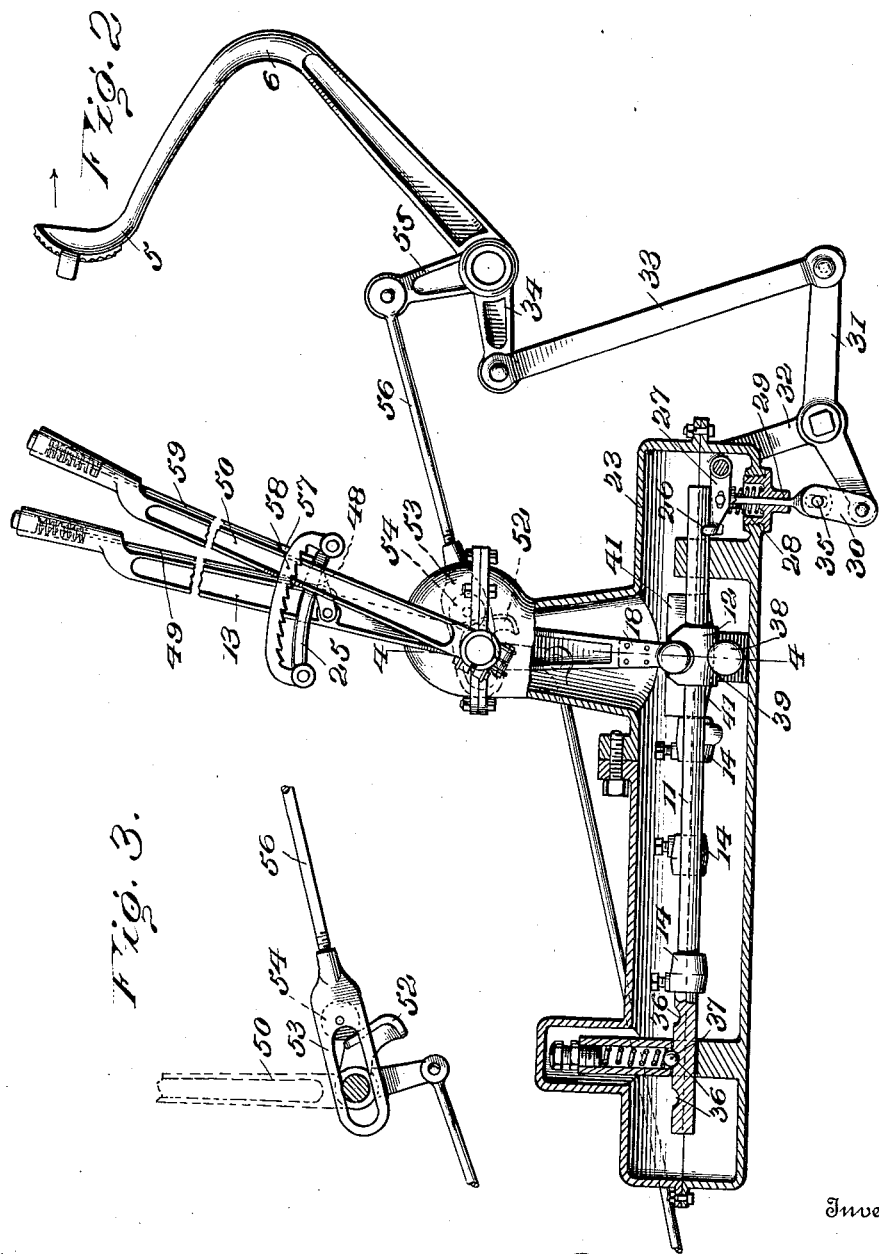

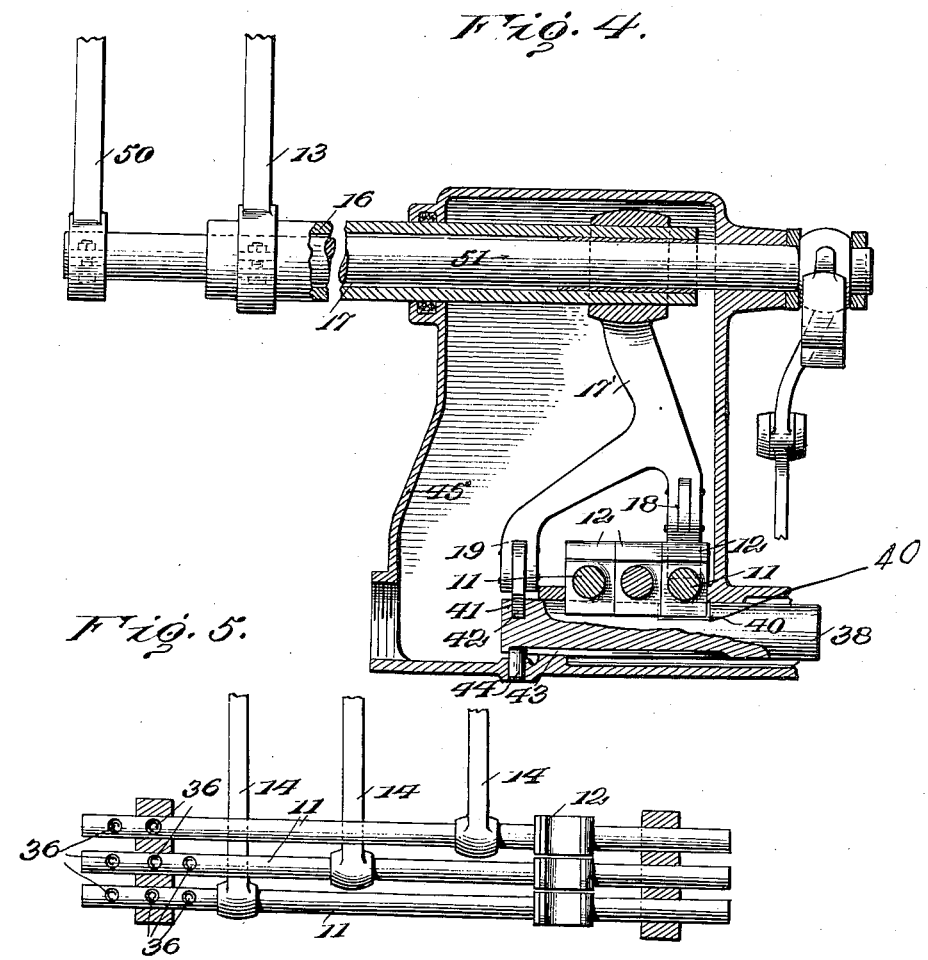

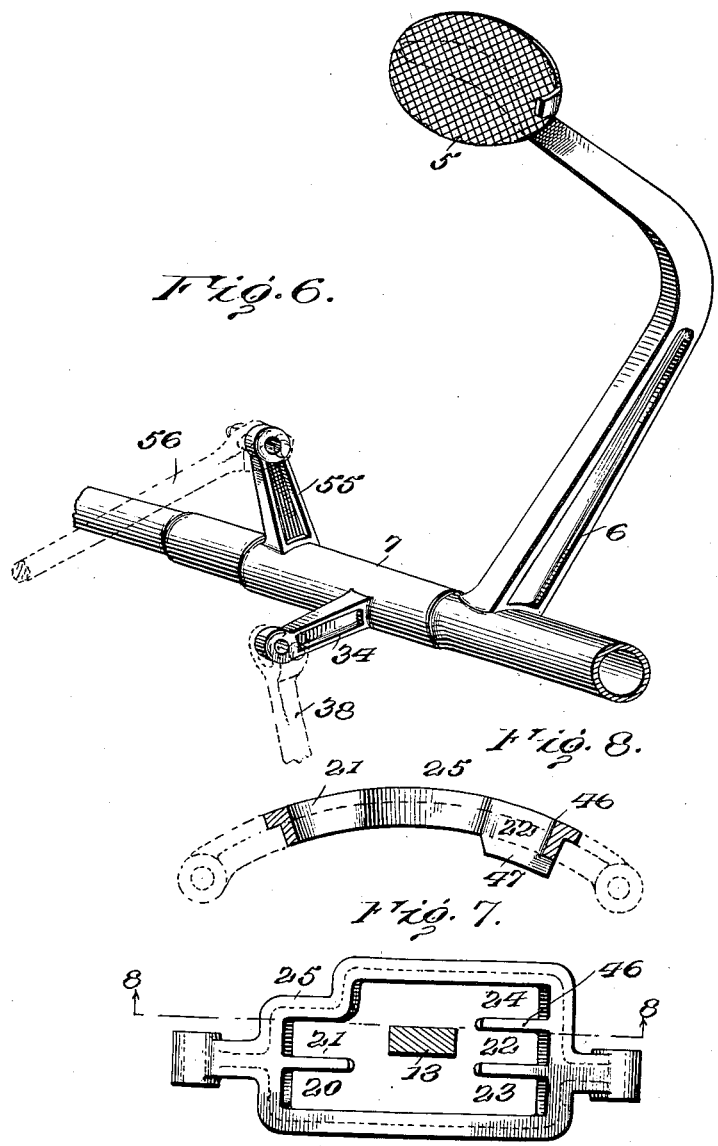

UNITED STATES PATENT OFFICE.

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

TRANSMISSION-CONTROLLING MECHANISM FOR MOTOR-VEHICLES.

1,098,143. Specification of Letters Patent. Patented May 26, 1914.

Original application filed September 18, 1906, Serial No. 335,142. Divided and this application filed January 10, 1911. Serial No. 601,918.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Transmission-Controlling Mechanism for Motor-Vehicles, of which the following is a specification, reference being had therein to the accompanying drawing.

This invention relates to improvements in transmission controlling mechanism for motor vehicles, and is a division of our application filed September 18th 1906, Serial No. 335,142.

The particular type of sliding gear transmission with which the present invention is designed to coöperate, is known as the "selective" type, and the objects of the present invention are to lock the mechanism in its neutral position before a change of gear can be made and to prevent the reverse gear from being accidentally thrown into operation.

In order to have the present improvement fully understood, the construction disclosed and claimed in the said parent application is here shown and described, and the description necessarily is identical, or practically identical, with the description of the aforesaid application.

In the accompanying drawings: Figure 1 is a view showing in side elevation the devices which comprise our invention attached to a motor vehicle. Fig. 2 is an enlarged detached side elevation of the features involving the invention, a portion of the supporting case thereof being shown in section. Fig. 3 is an enlarged detached view of the coöperating devices between the clutch pedal and the brake lever. Fig. 4 is an enlarged sectional view on the line 4—4 of Fig. 2. Fig. 5 is a detached top plan view of the selective rods. Fig. 6 is an enlarged detached perspective view of the clutch pedal and the parts immediately connected thereto. Fig. 7 is a detached plan view of the guiding or selective plate for the transmission hand controlling lever. Fig. 8 is a sectional view on line 8—8 of Fig. 7 thereof.

Referring now to the drawing, 1 indicates the frame, 2 the engine, 3 the front supporting and steering wheels, and 4 the rear supporting and driving wheels, all of which may be of the usual construction.

As is well known, a single clutch is used for sliding gear transmission of the selective type, and so far as the present invention is concerned any desired form of clutch may be used, and hence we do not show any specific form of clutch. The clutch pedal 5 is at the end of an arm 6, and this arm is suitably supported to permit an oscillating movement of the pedal. An arm 34 is suitably connected to a clutch (not shown) which is located in a clutch case 10. It is well known that in the form of clutch used with sliding gear transmission, the clutch is normally held in operative engagement by means of a spring or springs, and hence this need not be shown or described.

When the clutch pedal is in the position shown in Fig. 2 it is in operative engagement, but when moved in the direction indicated by arrow in said figure it will be moved out of operative engagement. In the selective type here shown, there is employed a plurality of sliding rods 11, and each of these rods is provided with a recessed member or block 12, with which the controlling lever 13 coöperates in a manner to be presently explained. Each rod carries a member 14, that is suitably connected with the sliding gear mechanism, but as this forms no part of the present invention the transmission mechanism and the connections of the members 14 therewith is not shown, nor is it necessary to a full understanding of the invention.

Referring now more particularly to Fig. 4, the transmission gear controlling lever 13 (which will be hereafter referred to as the transmission lever) is attached to a sleeve 16 that may be slid and oscillated on a rod 17, and the lever is located outside of the car frame, as shown in Fig. 1. An arm 17' has its upper end connected with the sleeve 16 and this arm 17' is forked as shown, having an arm 18 and an arm 19. As shown in Fig. 2, the lower end of the arm 18 is shaped to engage the recessed member 12. By sliding the transmission lever 13 transversely of the rods 11 its lower end can be made to engage either one of the members 12 desired, and thus when oscillated will move the selected rod endwise for controlling the sliding gear transmission. When the transmission lever is in the position shown in Figs. 1, 2 and 7, it is neutral, and the gears of the transmission are out of mesh. When it is moved to pass into any one of the slots 20, 21, 22, 23 or 24 of the guiding plate 25, and is then moved into said slot, it will select the desired speed of the transmission. The slotted plate 25 requires that the transmission lever be returned to its neutral or central position before a change of gear can be made, and relates to means for locking all of the rods 11 when they are brought to neutral position, and to require the release of the clutch for unlocking the rods so a change of gear cannot be made without first releasing the clutch, for the purpose of preventing injury to, or the stripping of gears by passing from one speed to another while the clutch is in operative relation to the engine. We will now describe the mechanism for accomplishing the foregoing result. Each of the rods 11 is provided in its under side with a recess 26, and pivoted below the rods is a spring latch 27, wide enough and adapted to engage the said recesses 26 of all the rods and lock them in their neutral position, as shown in Fig. 2. Before any of the rods 11 can be moved by the transmission lever for controlling the gears of the transmission, the latch 27 must be disengaged from the recess of the rods. This latch is removably held into the recesses by an expanding spiral spring 28. This spring surrounds a rod 29 which has its upper end connected to the latch intermediate its ends, and has its lower end connected with a link 30. The link 30 is in turn connected with one end of a lever 31, which is intermediately pivoted to a supporting arm 32 projecting from the casing 23. A link 33 connects the opposite end of the lever 31 to an arm 34, which is rigidly connected with the pedal arm 6. When the clutch is in operative engagement with the parts in the positions shown in Fig. 2, the latch is in locking engagement with the rods 11, and neither of them can be moved until the latch 27 is released by moving the clutch lever to a forward position and thereby releasing the clutch.

From the foregoing it will be noted that the transmission controlling mechanism is locked when it is in a neutral position, and the clutch must be released before any of the gears can be put into mesh. So also, if the mechanism is operating through one series of gears, it cannot be changed without bringing the rod 11 which is controlling the mechanism to its neutral position. When it reaches its neutral position, the latch snaps into the recess of the rod and locks it. A slot 35 in the link 30 permits the latch to have an upward movement independent of the lever 31 and independent of the clutch when the clutch is in operative engagement. Hence the clutch must be disengaged before the gear can be changed. The rods 11 have recesses 36 in which spring detents or balls 37 engage, so that the operator can feel the engagement thereof when operating the transmission lever 13 and thus know when the parts are in proper position for the several speeds.

Means is provided for positively locking the selective rods not in use in their neutral positions, and thus prevent any accidental shifting of the gears from any cause. This means consists of a rod 38 which is located and slides transversely of the selective rods 11, and the lower sides of the blocks 12 are provided with recesses 39 which receive the upper portion of the rod 38. Formed in the rod 38 is a notch 40 located under the arm 18, and of a width sufficient to permit one of the blocks 12 to pass through, and thus permit the rod 11, which has been selected, to be moved endwise. Carried by the arm 19 of the transmission lever 13, is a segment 41 which enters a groove 42 in the rod 38.

When the transmission lever is moved laterally for selecting the desired rod 11, the rod 38 is moved therewith, and the slot 40 will be under the rod 11 that is selected, and thus permit it to be moved while the other rods 11 are locked against movement by the rod 38, as will be readily understood. To prevent the rod 38 from turning it is provided with a longitudinal groove 43 into which a suitable pin or projection 44 carried by the case 23 projects. To prevent accidental or unintentional engagement of the reverse speed, the wall 46 of the reverse slot 24 is provided with a depending lip 47, and the transmission lever 13 is provided with a pawl 48 below the plate 25 which is connected with a spring-held push rod 49 carried by the lever 13, and this pawl is normally held thereby against the under side of the plate 25. The pawl 48 and lip 47 therefore prevent the transmission lever from being moved laterally opposite the reverse slot 24 until the pawl is depressed, and thus guards against the operator accidentally or unintentionally throwing in the reverse speed. The brake lever 50 is connected with the clutch pedal 5, so that when the brake is applied the clutch is released. This is accomplished as follows: The rod 51 passes through the tubular member 16 and the brake lever 50 is attached to its outer end (Fig. 4). Attached to the inner end of the rod 51 is a cam 52 (Figs. 3-4) and straddling the rod is a slotted member or yoke 53 which carries a roller 54. This yoke 53 is attached to an arm 55 by means of a rod or link 56, and the arm 55 is firmly connected with the clutch pedal as shown in Fig. 6. When the brake lever is pulled back to apply the brake the cam 52 is caused to engage the roller 54 and force the yoke 53 forward, and through the rod 56 connections move the clutch pedal in the direction indicated by the arrow in Fig. 2, and thus release the clutch. When the brake parts are in the neutral position shown in Fig. 2, the slotted yoke permits the clutch pedal to be moved into releasing position independent of the brake. A spring catch or pawl 57 co-acting with a ratchet segment 58 serves to hold the brake lever in applied position until released by depressing the rod 59.

Having thus described our invention, what we claim and desire to secure by Letters Patent is:

1. In a controlling mechanism of the type described, the combination with a plurality of independent gear operating members, a single selective member therefor and adapted to independently operate said gear operating members, means controlled by said selective member and locking those gear operating members at neutral which are not operated by said selective member and unlocking the gear operating member which is operated by said selective member, of a lock for all of said gear operating members when they all are at neutral, and a clutch operating member operatively connected with said lock, the parts coöperating as and for the purpose described.

2. In a motor vehicle, the combination of a plurality of speed selective members, a lock for holding them at neutral, a transmission clutch controlling member, means controlled by said clutch member adapted to release said lock when the clutch member is in releasing position, a swinging and laterally-movable lever adapted to separately actuate the selective members, a guide plate having slots for the lever, the plate having a shoulder, a pawl carried by the lever and adapted to prevent lateral movement of the lever when it is opposite the reverse slot.

In testimony whereof we hereunto affix our signatures in the presence of two witnesses.

ALEXANDER WINTON.
HAROLD B. ANDERSON.

Witnesses:
W. J. WARD,
G. M. LAVELLE.